United States Patent
Watanabe

(10) Patent No.: US 8,094,205 B2
(45) Date of Patent: Jan. 10, 2012

(54) IMAGING APPARATUS, IMAGE PROCESSING METHOD AND COMPUTER PROGRAM FOR SMOOTHING DYNAMIC RANGE OF LUMINANCE OF AN IMAGE SIGNAL, COLOR CONVERSION PROCESS

(75) Inventor: Yoshinori Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 11/969,760

(22) Filed: Jan. 4, 2008

(65) Prior Publication Data

US 2008/0211923 A1    Sep. 4, 2008

(30) Foreign Application Priority Data

Jan. 12, 2007    (JP) ................. 2007-004767

(51) Int. Cl.
*H04N 5/228*    (2006.01)

(52) U.S. Cl. ........... 348/222.1; 348/223.1; 348/294; 348/362; 382/162; 382/167; 345/604; 358/518

(58) Field of Classification Search ........ 348/222.1, 348/96, 223.1, 294, 362; 382/162, 167, 236, 382/239, 243; 345/604; 358/2.1, 3.24, 518
See application file for complete search history.

(56) References Cited

U.S. PATENT DOCUMENTS

| | | | |
|---|---|---|---|
| 5,850,253 A * | 12/1998 | Inoue et al. ............ | 348/96 |
| 6,873,729 B2 | 3/2005 | Matsushima | |
| 7,006,692 B2 | 2/2006 | Matsushima | |
| 7,327,876 B2 * | 2/2008 | Hoshuyama ............ | 382/167 |
| 7,425,985 B2 | 9/2008 | Kawai | |
| 7,864,226 B2 * | 1/2011 | Asada ................. | 348/231.99 |
| 2002/0021360 A1 * | 2/2002 | Takemoto .............. | 348/222 |
| 2003/0086621 A1 * | 5/2003 | Hata et al. ............. | 382/239 |
| 2004/0169751 A1 * | 9/2004 | Takemura et al. ....... | 348/294 |
| 2005/0157346 A1 * | 7/2005 | Kitagawara et al. ..... | 358/2.1 |
| 2005/0190967 A1 * | 9/2005 | Ok et al. .............. | 382/167 |
| 2006/0158529 A1 * | 7/2006 | Katagiri .............. | 348/222.1 |
| 2006/0158565 A1 * | 7/2006 | Miyazawa et al. ...... | 348/656 |
| 2008/0055426 A1 * | 3/2008 | Pertsel et al. ......... | 348/223.1 |
| 2008/0187215 A1 * | 8/2008 | Gordon et al. .......... | 382/162 |

FOREIGN PATENT DOCUMENTS

| | | |
|---|---|---|
| JP | 2001-257902 A | 9/2001 |
| JP | 2001-358983 A | 12/2001 |
| JP | 2002-092607 A | 3/2002 |
| JP | 2004-3581270 B2 | 10/2004 |
| JP | 2005-210208 A | 8/2005 |
| JP | 2006-065676 A | 3/2006 |

* cited by examiner

*Primary Examiner* — Tuan Ho
*Assistant Examiner* — Kent Wang
(74) *Attorney, Agent, or Firm* — Carter, DeLuca, Farrell & Schmidt LLP

(57) ABSTRACT

An imaging apparatus include an imaging unit configured to capture an object image, a smoothing unit configured to smooth a dynamic range of luminance of an image signal generated based on the object image captured by the imaging unit, and a color conversion unit configured to perform a color conversion with respect to a color of the image signal whose dynamic range is smoothed by the smoothing unit and is specified by a user.

16 Claims, 4 Drawing Sheets

IMAGING APPARATUS, IMAGE PROCESSING METHOD AND COMPUTER PROGRAM FOR SMOOTHING DYNAMIC RANGE OF LUMINANCE OF AN IMAGE SIGNAL, COLOR CONVERSION PROCESS

BACKGROUND OF THE INVENTION

1. Field of the Invention

The present invention relates to a process for smoothing a dynamic range of luminance of an image signal, and a color conversion process of an image signal.

2. Description of the Related Art

Some types of digital cameras have a color conversion function that can arbitrarily replace a color of an object image selected by a user with an intended color at the time of shooting. The color conversion function includes a one-point color function or a spot color function. For example, Japanese Patent Application Laid-Open No. 2005-210208 discusses a technique that reads out specified color information from a color database when a replacement target color and a color to be converted are specified by a user. Based on the read color information, color of the digital image data is converted.

According to the technique discussed in Japanese Patent Application Laid-Open No. 2005-210208, the color conversion can be performed when the digital camera performs the shooting. That is, the user can instruct the shooting start while checking a color-converted image using an electronic viewfinder (EVF). Accordingly, it is possible to capture the image that is color-converted according to the user's preference without the inconvenience of importing the image into a personal computer (PC) or the like after the shooting, and editing the imported image.

In a shooting operation using digital cameras, depending on scenes to be shot, there is a big difference in luminance (density) of the images. That is, dynamic ranges of the luminance of the images become very wide, for example, in a case of flash shooting and shooting in backlight. In a case of shooting the scenes that have wide dynamic ranges, in order to smooth the dynamic ranges of film images, a dodging process is performed. In the dodging process, while normal exposure is performed on middle density parts, the light exposure for bright parts is reduced where luminance of images is high and there is a possibility that the images are saturated. On the other hand, the light exposure in dark parts is increased where there is a possibility that the images are deteriorated. By employing the dodging process, the big luminance difference of an image taken on a film is corrected and it is possible to obtain the image that has appropriate luminance over the image such that impression of the image is close to the scene that the user actually saw.

To obtain effects similar to the dodging process for digital images, various techniques have been proposed. For example, Japanese Patent Application Laid-Open No. 2001-257902 discusses a technique that in smoothing a dynamic range of a digital image, prevents giving too sharp impression to a color of the image when the gradation is hardened, or prevents the color of the image from becoming dull when the gradation is softened. In Japanese Patent Application Laid-Open No. 2001-257902, according to a degree of the gradation conversion rate, a multiplying coefficient for each color component is calculated using arithmetic expressions. Then, while the gradation of the image data is being converted, saturation of the color is also converted using the obtained coefficient to realize a further natural image.

However, according to the Japanese Patent Application Laid-Open No. 2005-210208, in a case of a scene having a very wide dynamic range, if a composition of an object is changed while the object image is displayed on an EVF, luminance of the color conversion target changes. Accordingly, as to the same object image, color conversion varies. Moreover, the technique of Japanese Patent Application Laid-Open No. 2001-257902 is directed to adjusting the dynamic range and performing the color conversion process based on the gradation conversion rate. However, the technique discussed in Japanese Patent Application Laid-Open No. 2001-257902 is not directed to converting the color of the object image to the one specified by the user at the time of shooting, that is, the one point color function or the spot color function. Accordingly, when the scene having the wide dynamic range is shot, even if the same object image is captured, the color conversion varies and it is not possible to solve the problem that occurs in Japanese Patent Application Laid-Open No. 2005-210208.

SUMMARY OF THE INVENTION

The present invention is directed to reducing variations in color conversion generated in a wide dynamic range shot scene.

According to an aspect of the present invention, an imaging apparatus include an imaging unit configured to capture an object image, a smoothing unit configured to smooth a dynamic range of luminance of an image signal generated based on the object image captured by the imaging unit, and a color conversion unit configured to perform a color conversion with respect to a color of the image signal whose dynamic range is smoothed by the smoothing unit in accordance with specification of the color by a user before the dynamic range is smoothed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EXEMPLARY EMBODIMENTS

Embodiments of the invention will be described in detail below with reference to the drawings.

First Exemplary Embodiment

Figure 1:
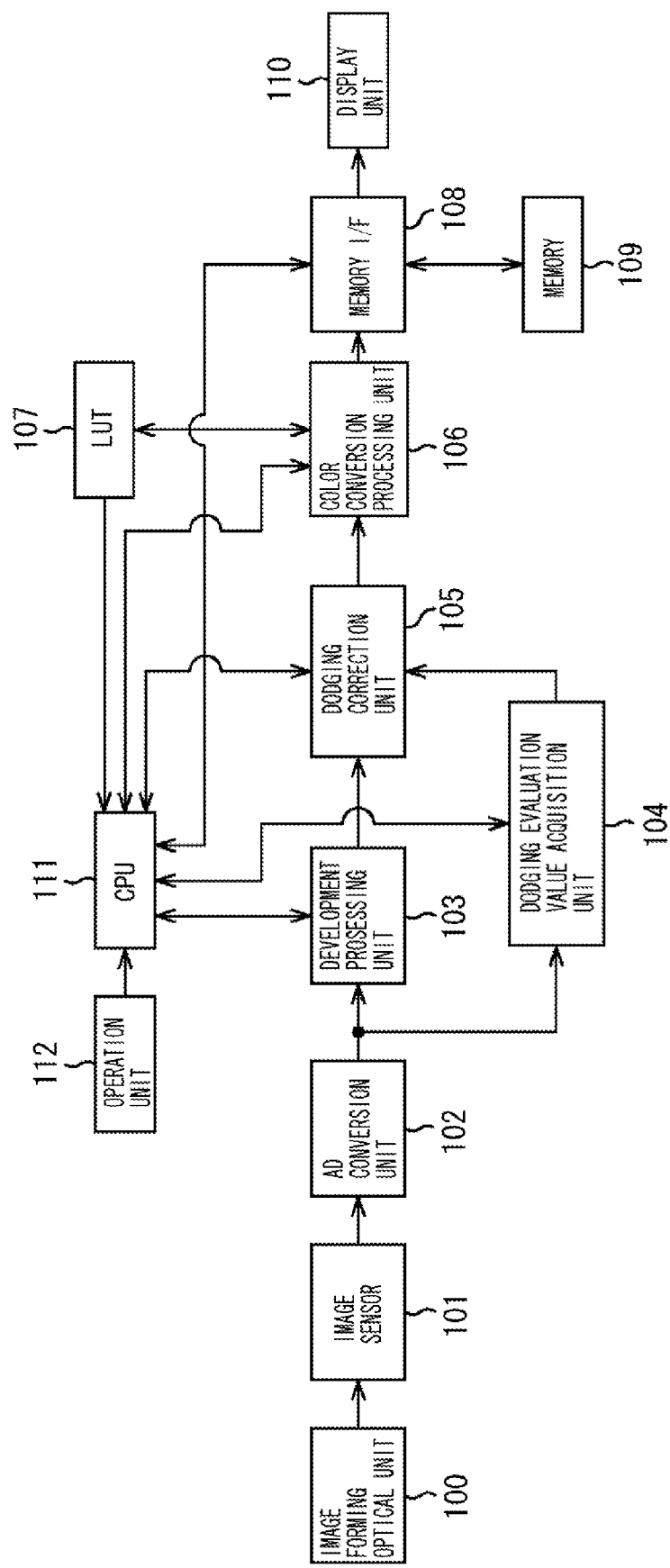
FIG. 1 is a block diagram illustrating an example of an imaging apparatus according to a first exemplary embodiment of the present invention.

FIG. 1 is a block diagram illustrating an example of an imaging apparatus according to a first exemplary embodiment of the present invention. In FIG. 1, an image sensor 101 captures an object image entered through an image forming optical unit 100, and photoelectrically converts the captured image into an electric signal. An analog/digital (A/D) conversion unit 102 converts the electric signal output from the image sensor 101 into a digital signal.

A development processing unit 103 converts the digital signal output by the A/D conversion unit 102 into image data of a YUV data format. The development processing unit 103 includes a white balance (WB) circuit, a gamma (γ) correction circuit, and a matrix conversion circuit as main components. A dodging evaluation value acquisition unit 104 generates a simple luminance signal of the digital signal (image signal) output by the A/D conversion unit 102, and calculates an evaluation value of a dodging process that is performed on an original image using the simple luminance signal. More specifically, the dodging evaluation value acquisition unit 104 generates a Y signal as the simple luminance signal using only G signal from an RGB signal that is the digital signal (image signal) output by the A/D conversion unit 102. The dodging process is signal processing to reduce (smooth) a difference between a maximum value and a minimum value of luminance distribution in a dynamic range of a digital image. The evaluation value of the dodging process is used to correct luminance of the digital image by reducing (smoothing) the difference between the maximum value and the minimum value of luminance distribution in the dynamic range of the digital image. By performing the dodging process, for example, luminance of an image area corresponding to a main object is relatively increased as compared with other image areas.

A specific example of the dodging process is described in detail. In the first exemplary embodiment, a technique for adjusting a dynamic range of luminance of an original image is described as an example. According to the technique, an image signal of the original image is generated, and then a signal of a blurred image (hereinafter, referred to as blurred image signal) is generated from the original image. Then, with respect to pixels corresponding to the image signal and the blurred image signal of the original image, arithmetical operation is performed respectively, and a differential signal of these pixels is generated. In the first exemplary embodiment, as an example, a predetermined image process is performed on the generated differential signal and a dynamic range of luminance of the original image is adjusted.

Figure 2:
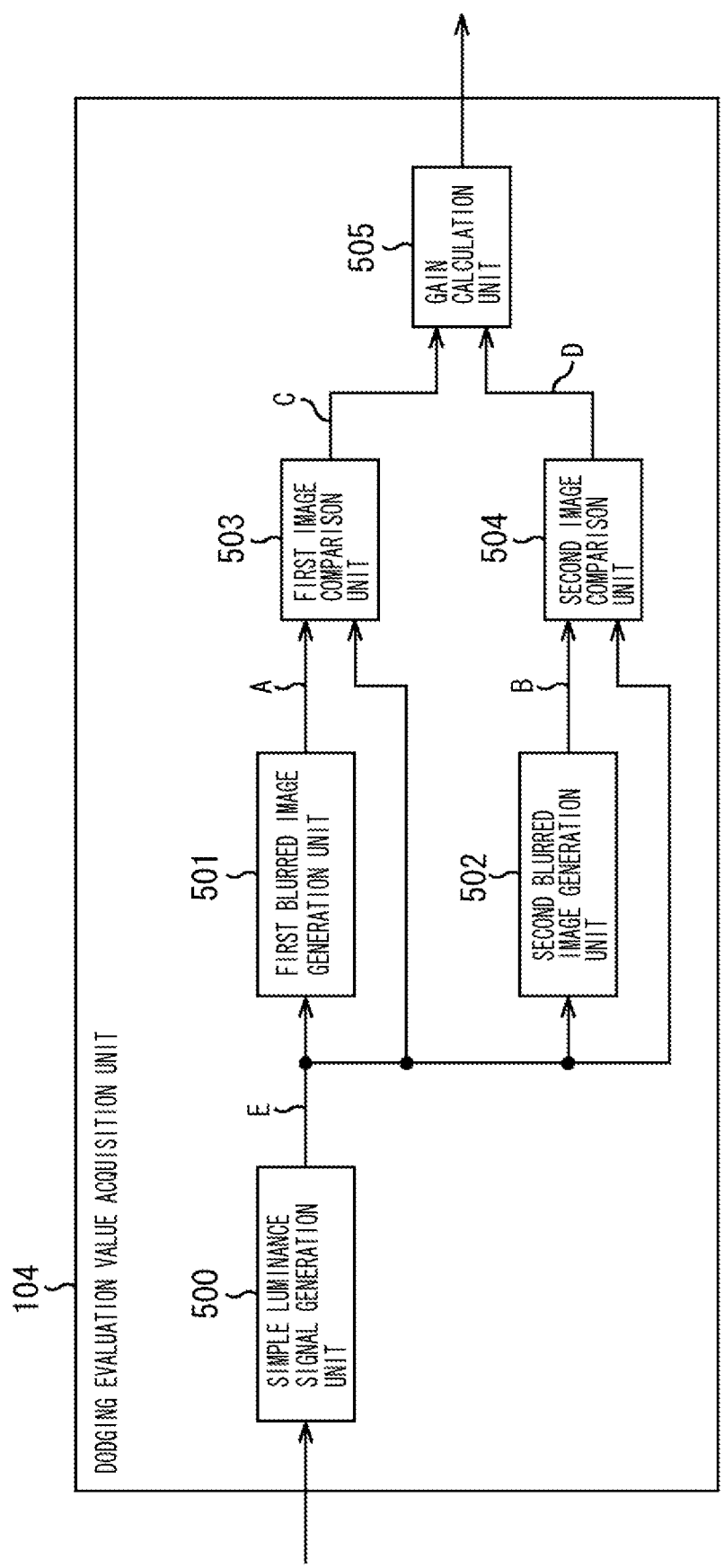
FIG. 2 is a block diagram illustrating a dodging evaluation value acquisition unit in detail according to the first exemplary embodiment of the present invention.

FIG. 2 is a block diagram illustrating an example of the dodging evaluation value acquisition unit 104 in FIG. 1 according to the first exemplary embodiment of the present invention. In FIG. 2, a simple luminance signal generation unit 500 generates a simple luminance signal E based on the image signal output by the A/D conversion unit 102 illustrated in FIG. 1. As described above, the simple luminance signal generation unit 500 generates a Y signal as the simple luminance signal E using only a part (G signal) of the RGB signal that is the image signal output by the A/D conversion unit 102.

A first blurred image generation unit 501 generates a blurred image signal A based on the simple luminance signal E generated by the simple luminance signal generation unit 500. The defocused image signal A is a blurred image signal of the simple luminance signal E and has a resolution lower than that of the simple luminance signal E. A second blurred image generation unit 502 generates a blurred image signal B based on the simple luminance signal E output by the simple luminance signal generation unit 500. The defocused image signal B is a blurred image signal of the simple luminance signal E and has a resolution further lower than that of the blurred image signal A. Thus, in the first exemplary embodiment, for example, using the blurred image signals A and B, the image signals that are generated by lowering the resolution of the simple luminance signal (image signal) and have mutually different resolutions, are realized.

A first image comparison unit 503 obtains difference value information C between the simple luminance signal E and the blurred image signal A for each pixel corresponding to the simple luminance signal E output from the simple luminance signal generation unit 500 and the blurred image signal A output from the first blurred image generation unit 501. A second image comparison unit 504 obtains difference value information D between the simple luminance signal E and the blurred image signal B for each pixel corresponding to the simple luminance signal E output by the simple luminance signal generation unit 500 and the blurred image signal B output by the second blurred image generation unit 502.

A gain calculation unit 505 calculates a gain coefficient by which the luminance value of each pixel of the original image is multiplied, using the difference value information C output from the first image comparison unit 503 and the difference value information D output from the second image comparison unit 504. The gain calculation unit 505 outputs the calculated gain coefficient as a dodging evaluation value. As described above, in the first exemplary embodiment, for example, a correction value of the luminance of the image signal is realized using the gain coefficient. Further, a correction value derivation unit is realized using the dodging evaluation value acquisition unit 104.

Returning to FIG. 1, a dodging correction unit 105 performs the following process based on the image data output from the development processing unit 103 and the dodging evaluation value output from the dodging evaluation value acquisition unit 104. That is, the dodging correction unit 105 decreases the gain of the image data in an area where luminance of the blurred image is high and increases the gain of the image in an area where the luminance of the blurred image is low. Thus, the dodging correction unit 105 smoothes (reduces) a dynamic range of the entire image data (i.e., performs a dodging process). The image data subjected to the dodging process is sent to a color conversion processing unit 106.

An operation unit 112 is an input unit in a system that enables a user to specify a color to be converted. More specifically, the operation unit 112 includes a button, a switch, a dial and the like. A user specifies a color to be converted by operating the operation unit 112 while checking an image displayed on an EVF by a display unit 110.

Based on the color information specified by the operation of the operation unit 112, the color conversion unit 106 reads information about the color to be converted from a look-up-table (LUT) 107 and performs a color conversion on the image data input by the dodging correction unit 105. The LUT 107 is stored in, for example, a hard disk, an electrically erasable programmable read-only memory (EEPROM), or a read-only memory (ROM) provided in the imaging apparatus. An example of the color conversion performed by the color conversion processing unit 106 is described below. The color conversion processing unit 106 converts the input image data from a YUV signal to an RGB signal. Signal values of each color component (i.e., R, G, and B) in the converted RGB signal are used as an address for reading out color conversion matrix information from the LUT 107. For example, it is assumed that the signal values (values of color conversion matrix information) of each color component R, G, and B in the RGB signal are 18, 20, and 30 (R=18, G=20, B=30) respectively. Then, the color conversion processing unit 106 defines the signal values as an address (X=18, Y=20, Z=30), and reads out different color conversion matrix information (for example, R'=40, G'=10, B'=23) corresponding to the address from the LUT 107.

Based on this read out color conversion matrix information, the color conversion processing unit 106 performs a color conversion by adjusting the gains of each color component of the RGB signal. After the color conversion process is performed, the color conversion processing unit 106 returns the signal format from the RGB signal to the YUV signal. Then, the color conversion process of the input image data is finished. In the first exemplary embodiment, thus, a smoothing unit is realized using, for example, the dodging correction unit 105.

The image data color-converted by the color conversion processing unit 106 is stored in a memory 109 via a memory interface (I/F) 108. The memory 109 can be formed using a RAM, an EEPROM, or a hard disk. Further, the memory 109 can be an external recording medium such as a removable medium. In the exemplary embodiment, thus, a color conversion unit is realized using, for example, the color conversion processing unit 106.

The display unit 110 reads out the image data stored in the memory 109 via the memory I/F 108, and displays the image on a display device (EVF) such as a liquid crystal display (LCD). The user can instruct shooting while checking the image displayed on the display device that has been subjected to the dodging process, or the image dodging process and color conversion process. When the user depresses a shooting/recording button such as a shutter button to instruct the shooting, the image subjected to the dodging process or, the image subjected to the dodging process and color conversion process is recorded in the memory 109 via the memory I/F 108. The image data may be compressed in a compression format such as a JPEG before the data is recorded in the memory 109.

Figure 3:
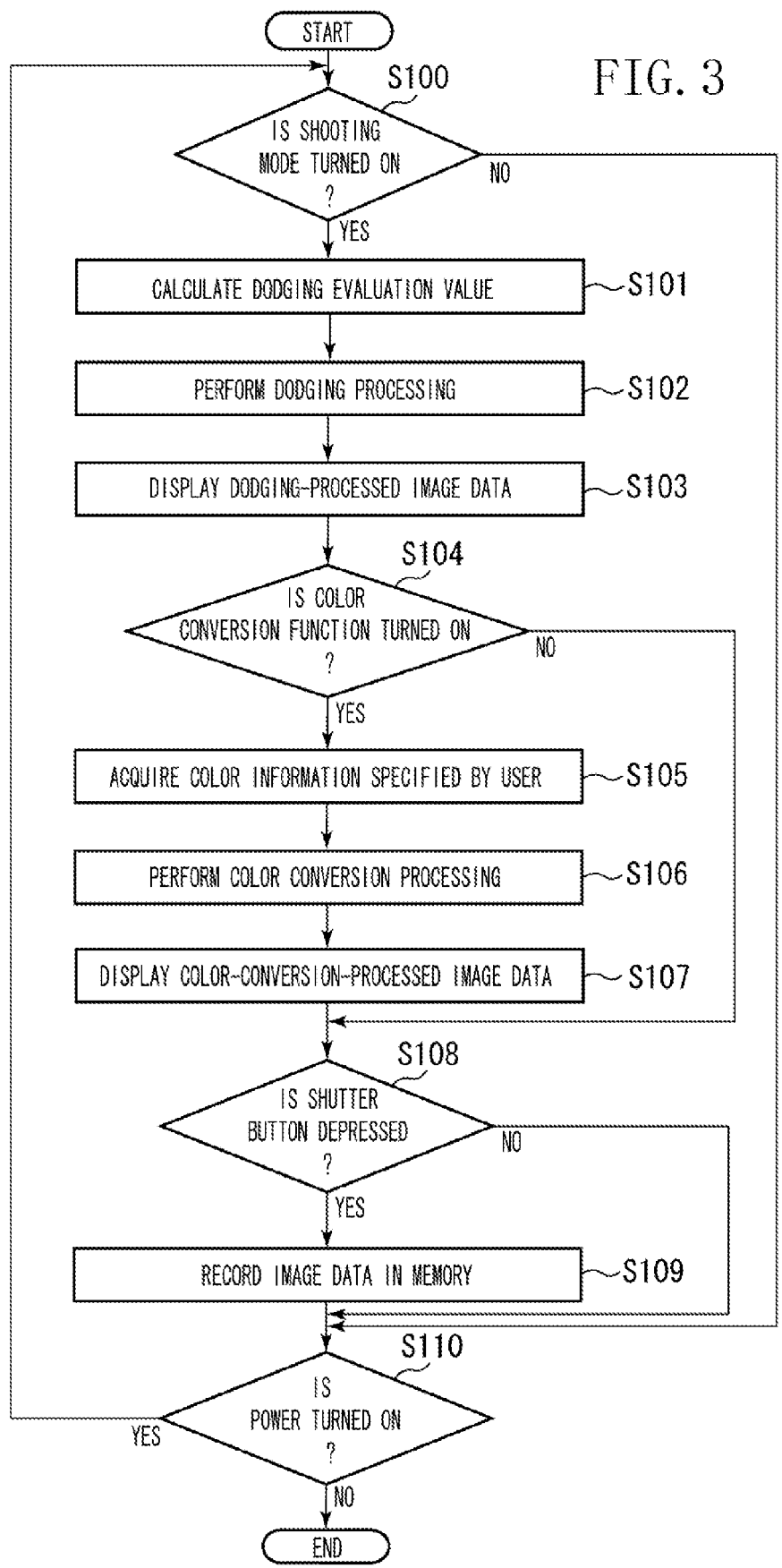
FIG. 3 is a flowchart illustrating an example of operation in the imaging apparatus when color conversion of image data is performed at the time of shooting according to the first exemplary embodiment of the present invention.

With reference to the flowchart in FIG. 3, an example of operation performed in the imaging apparatus when the color conversion of image data is performed at the time of shooting, is described. In response to the operation of the operation unit 112, when a power supply of the imaging apparatus is turned on, the operation illustrated in the flowchart in FIG. 3 starts. First, in step S100, a central processing unit (CPU) 111 determines whether a shooting mode is turned on by checking operation performed in the operation unit 112. If the shooting mode is turned off (NO in step S100), the process proceeds to step S110 and the CPU 111 determines whether the power supply of the imaging device is turned on. If the power supply of the imaging apparatus is turned on (YES in step S110), the process returns to step S100. On the other hand, if the power supply of the imaging apparatus is turned off (NO in step S110), the process ends.

If the shooting mode is turned on (YES in step S100), the process proceeds to step S101. In step S101, the dodging evaluation value acquisition unit 104 calculates a dodging evaluation value. More specifically, as described above, the dodging evaluation value acquisition unit 104 generates the simple luminance signal E based on the image signal output from the A/D conversion unit 102 and generates the blurred image signals A and B based on the generated simple luminance signal E. The dodging evaluation value acquisition unit 104 obtains the difference value information C between the simple luminance signal E and the blurred image signal A, and also obtains the difference value information D between the simple luminance signal E and the blurred image signal B. Then, using the difference value information C and D, the dodging evaluation value acquisition unit 104 calculates a gain coefficient by which each pixel of the original image is multiplied, and outputs the obtained gain coefficient as the dodging evaluation value.

Then, in step S102, the dodging correction unit 105 performs a dodging process on the image data output from the development processing unit 103 using the dodging evaluation value output from the dodging evaluation value acquisition unit 104. More specifically, the dodging correction unit 105 decreases the gain of the image data in an area where the luminance of the defocused image is relatively high and increases the gain of the image data in an area where the luminance of the defocused image is relatively low. By such a process, the dynamic range of the entire image data is smoothed.

In step S103, the CPU 111 instructs the display unit 110 to display the image data subjected to the dodging process in step S102 on a display device such as an LCD. In response to the instruction, the dodging-processed image data is displayed on the display device (EVF). Then, in step S104, the CPU 111, for example, based on the operation performed in the operation unit 112, determines whether a color conversion function is turned on. If the color conversion function is turned off (NO in step S104), steps S105 to S107 are skipped and the process proceeds to step S108. On the other hand, if the color conversion function is turned on (YES in step S104), the process proceeds to step S105. In step S105, the CPU 111 acquires color information specified by the user in the operation of the operation unit 112. That is, the CPU 111 acquires the information about the target color of the color conversion.

In step S106, based on the color information acquired in step S105, the color conversion processing unit 106 performs a color conversion process on the image data that is subjected to the dodging-process in step S102. Then, in step S107, the CPU 111 instructs the display unit 110 to display the image data subjected to the color conversion process in step S106 on the display device such as an LCD. In response to the instruction, the image data that has been subjected to the color conversion process after the dodging process is displayed on the display device (EVF).

In step S108, the CPU 111, for example, based on the operation performed in the operation unit 112, determines whether a shutter button is depressed. If the shutter button is not depressed (NO in step S108), step S109 is skipped and the process proceeds to step S110. On the other hand, if the shutter button is depressed (YES in step S108), the process proceeds to step S109, and the CPU 111 records the image data on the memory 109, which has been subjected to the dodging process or to the image data color conversion process after the dodging process. Then, the process proceeds to step S110, and the CPU 111 determines, as described above, whether the power supply of the imaging apparatus is turned on. If the power supply of the imaging apparatus is turned on (YES in step S110), the process returns to step S100. If the power supply of the imaging apparatus is turned off (NO in step S110), the process ends.

As described above, in the first exemplary embodiment, the dodging evaluation value acquisition unit 104 generates the simple luminance signal E based on the image signal output from the A/D conversion unit 102 and generates the blurred image signals A and B based on the generated simple luminance signal E. The dodging evaluation value acquisition unit 104 calculates the difference value information C between the simple luminance signal E and the blurred image signal A, and also calculates the difference value information D between the simple luminance signal E and the blurred image signal B. Then, using the difference value information C and D, the dodging evaluation value acquisition unit 104 calculates the gain coefficient by which the luminance value of each pixel of the original image is multiplied. By using the gain coefficient calculated in the dodging evaluation value acquisition unit 104 as a dodging evaluation value, the dodging correction unit 105 decreases the gain of the image data in the area where the luminance of the defocused image is relatively high and increases the gain of the image data in the area where the luminance of the defocused image is relatively low. Thus, according to the process, the dynamic range of the entire image data is reduced (smoothed) and the dodging process (correction) is performed.

The display unit 110 displays the dodging-processed data on the display device (EVF). The color conversion processing unit 106 performs a color conversion on the thus dodging-processed image data based on the color information which is specified by the user with respect to the displayed image data. Then, the display unit 110 displays the color-converted image data on the display device (EVF).

As described above, in the first exemplary embodiment, after the dodging process is performed on the image data, the color conversion process is performed. Accordingly, in the color conversion process, the AE level of the target can be appropriately corrected as soon as possible. That is, the color conversion can be performed in the state that the luminance of the color-conversion target is substantially constant. Accordingly, even if a scene is shot that has a wide dynamic range, variation in the color conversion can be reduced. Further, in the first exemplary embodiment, with respect to the image data displayed on the EVF, it is possible to display the image data on which the color conversion is performed, after the AE level is corrected. Accordingly, the user can perform color specification while checking the image data on which the color conversion is performed after the AE level is corrected.

Further, in the first exemplary embodiment, the simple luminance signal E is generated based on the image signal output from the A/D conversion unit 102, and by using the generated simple luminance signal E, the dodging evaluation value is calculated. Accordingly, the size of the circuit for acquiring the dodging evaluation value can be reduced. Further, in the first exemplary embodiment, by using the blurred images A and B having different in spatial frequency bands, the dodging evaluation value is calculated. That is, the "blurred image A of the simple luminance signal E" that has a resolution lower than the simple luminance signal E, and the "blurred image B of the simple luminance signal E" that has a resolution further lower than the blurred image A are generated. The dodging evaluation value is calculated using the blurred images A and B. Accordingly, the dodging process performed at boundaries between bright parts and dark parts in the image, does not bring a sense of discomfort. That is, in the dodging process, while the local dynamic range can be corrected using the blurred image A, the image gives an impression that the part where the dynamic range is corrected using the blurred image A, stands out from the image. Then, by correcting the wide range dynamic range using the blurred image B, the part that gives the stand-out impression can be corrected to be natural as much as possible.

Second Exemplary Embodiment

Next, a second exemplary embodiment of the present invention will be described. In the above-described first exemplary embodiment, before the dodging process is performed, the gamma (γ) correction of the image data is performed by the development processing unit 103. In the second exemplary embodiment, first, the dodging process is performed and the dynamic range of the image data is smoothed.

Figure 4:
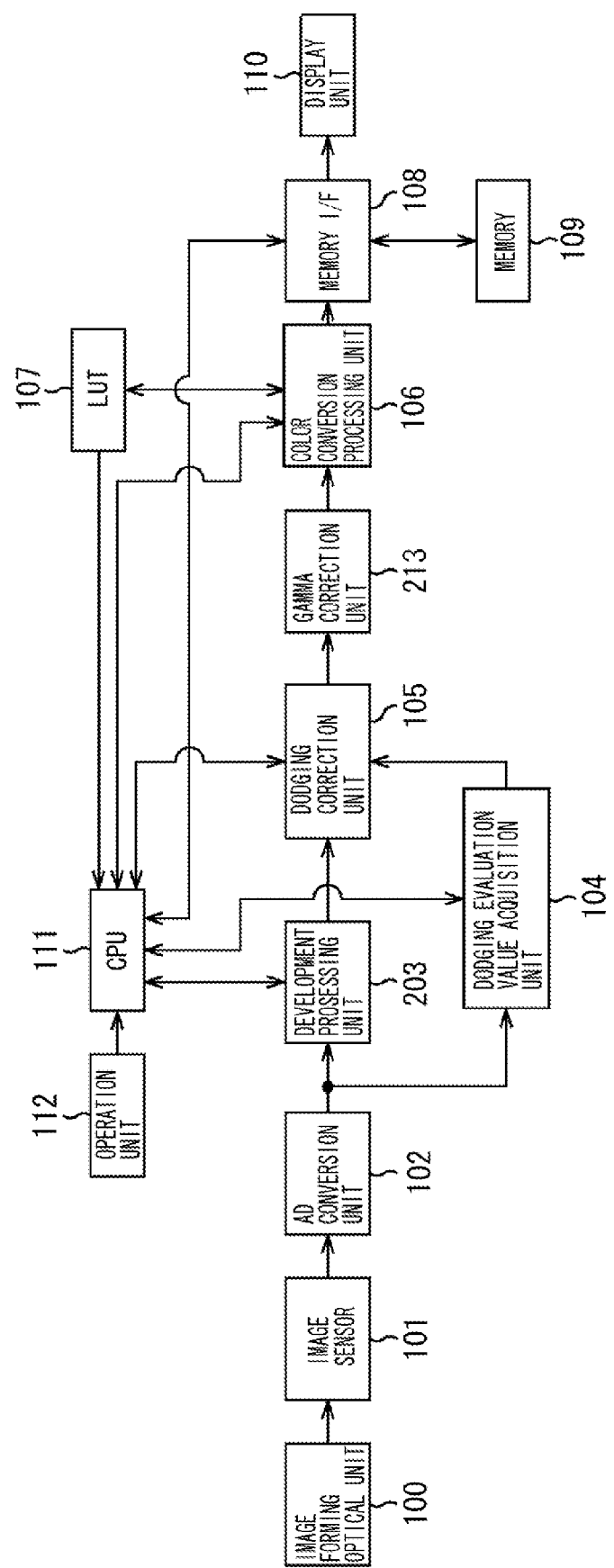
FIG. 4 is a block diagram illustrating an example of an imaging apparatus according to a second exemplary embodiment of the present invention.

Then, on the smoothed image data, the gamma (γ) correction is performed. Since the above-described first exemplary embodiment and the second exemplary embodiment differ only in a part of the image data processing, in the second exemplary embodiment, same reference numbers as in FIGS. 1 to 3 are applied to parts similar to the first exemplary embodiment, and their detailed descriptions will not be repeated. FIG. 4 is a block diagram illustrating an example configuration of an imaging apparatus. In FIG. 4, an object image having passed through the image forming optical unit 100 is photoelectrically converted into an electric signal by the image sensor 101, and the electric signal is converted into a digital signal by the A/D conversion unit 102. A development processing unit 203 includes the WB circuit and the matrix conversion circuit as main components to convert the digital signal output from the A/D conversion unit 102 into image data in the YUV data format. The development processing unit 103 illustrated in FIG. 1 includes the gamma (γ) correction circuit. However, the development processing unit 203 of the second exemplary embodiment does not include the gamma (γ) correction circuit.

The dodging evaluation value acquisition unit 104 acquires an evaluation value of the dodging process in the same manner as in the above-described first exemplary embodiment. The dodging correction unit 105 performs the dodging process based on the image data output from the development processing unit 103 and the dodging evaluation value output from the dodging evaluation value acquisition unit 104. The dodging-processed image data is sent to a gamma correction unit 213. The acquisition of the dodging process evaluation value and the dodging process are performed in the same manner as the first exemplary embodiment.

The gamma correction unit 213 performs a gamma correction on the dodging-processed image data in which a dynamic range is smoothed. Unlike the first exemplary embodiment, the gamma correction is performed after the dodging process is performed. Accordingly, it is possible to output an image that gives an impression closer to the scene the user actually saw. The image data output from the gamma correction unit 213 is sent to the color conversion processing unit 106. As described above, in the second exemplary embodiment, a gamma correction unit can be realized using, for example, the gamma correction unit 213.

Then the CPU 111 instructs the display unit 110 to display the image data that is gamma corrected after the dodging process, on a display device such as an LCD. In response to the instruction, the image data that is gamma-corrected after the dodging process, is displayed on the display device (EVF).

The color conversion processing unit 106 reads information about the color to be converted from the LUT 107 based on the color information specified through the operation of the operation unit 112, and performs a color conversion process on the image data input from the gamma correction unit 213. The color conversion process is performed in the same manner as in the first exemplary embodiment. Then, the CPU 111 instructs the display unit 110 to display the image data subjected to the color conversion process on the display device such as an LCD. In response to the instruction, the image data subjected to the color conversion process is displayed on the display device (EVF).

As described above, in the second exemplary embodiment, the gamma correction is performed on the dodging-processed image data. Accordingly, the gain at a dark part (low luminance part) can be increased without increasing noise. Further, even when the gain at a bright part (high luminance part) is decreased, the dodging process can be performed at a high signal-to-noise (SN) ratio without generating a pseudo outline. Accordingly, it is possible to perform the color conversion on the image that gives an impression closer to the scene which the user actually saw. That is, the color conversion can be performed based on a more natural image.

Other Exemplary Embodiments

The above-described units included in the imaging apparatus and each step of the image processing method according to one or more of the exemplary embodiments of the present invention can be implemented by executing a program stored on a RAM, a ROM, or the like in a computer. Accordingly, the program and the computer-readable recording medium that records the program constitute the present invention.

An aspect of the present invention can be applied, for example, to a system, an apparatus, a method, a program, or a storage medium. More specifically, an aspect of the present invention can be applied to a system including a plurality of devices or an apparatus consisting of a single device.

Further, a program (in the exemplary embodiments, the program corresponding to the flowchart illustrated in FIG. 3) of software implementing one or more of the above-described exemplary embodiments can be directly, or remotely provided to a system or an apparatus. Then, a computer in the system or the apparatus achieves an aspect of the present invention by reading and executing the provided program code.

Accordingly, the program code itself installed on the computer to implement the functional processing of an aspect of the present invention, implements the present invention. That is, the computer program itself for implementing the functional processing of the present invention constitutes the present invention.

In such a case, if the function of the program is realized, any form can be employed as the program, for example, a program implemented with an object code or an interpreter, and script data to be supplied to an operation system (OS), can be employed.

As the recording medium for supplying such program code, for example, a floppy disk, a hard disk, an optical disk, and a magneto-optical disk can be employed. Further, a magneto-optical disk (MO), a compact disk read-only memory (CD-ROM), a CD-recordable (CD-R), a CD-rewritable (CD-RW), a magnetic tape, a nonvolatile memory card, a ROM, and a DVD (a DVD-read only memory (DVD-ROM) and a DVD-recordable (DVD-R)) can be employed.

In addition, the program can be supplied by connecting to a home page of the Internet using a browser of a client computer. Then, the program is supplied from the home page by downloading the computer program itself of the present invention or a compressed file including an automatic installation function into a recording medium such as a hard disk and the like.

Further, the program code constituting the program according to the present invention can be divided into a plurality of files, and each file can be downloaded from different home pages. That is, a world wide web (WWW) server which allows a plurality of users to download the program file for realizing the functional processing of the present invention with the computer, is also included in the present invention.

Further, the program according to the present invention can be encrypted and stored on a storage medium such as a CD-ROM, and distributed to the users. A user who has cleared prescribed conditions is allowed to download key information for decrypting the cipher from a home page through the Internet. The user executes the encrypted program using the key information, and the program is installed on the computer. Thus, an aspect of the present invention can be realized.

Further, the function according to one or more of the embodiments described above can be implemented by executing the program code read by the computer. Furthermore, based on an instruction according to the program code, an OS and the like running on the computer executes a part or the whole of the actual processing, and thus, the function of one or more of the above-described embodiments can be realized.

Moreover, in another aspect of an exemplary embodiment of the present invention, the program code read from the storage medium is written on a memory which is provided in a function enhancing board inserted in the computer or in a function enhancing unit connected to the computer. Then, based on an instruction according to the program code, a central processing unit (CPU) or the like provided in the function enhancing board or in the function enhancing unit executes a part or the whole of the actual processing, and thus, the function of one or more of the above described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-004767 filed on Jan. 12, 2007 which is hereby incorporated by reference herein in its entirety.

What is claimed is:

1. An imaging apparatus comprising:
an imaging unit configured to capture an object image;
a smoothing unit configured to reduce a dynamic range of luminance of an image signal generated based on the object image captured by the imaging unit; and
a color conversion unit configured to perform a color conversion on the image signal whose dynamic range of luminance is reduced by the smoothing unit in accordance with a color specified by a user operation before the dynamic range of luminance is reduced,
wherein a color point to be converted is specified from a plurality of color points in a predetermined color space by the user operation, and
the color conversion unit converts the specified color point into another color point included in the plurality of color points in the predetermined color space.

2. The imaging apparatus according to claim 1, further comprising a gamma correction unit configured to perform a gamma correction on the image signal whose dynamic range of luminance is reduced by the smoothing unit,
wherein the color conversion unit converts the color of the image signal which is gamma-corrected by the gamma correction unit in accordance with the color specified by the user operation.

3. The imaging apparatus according to claim 1, further comprising a correction value derivation unit configured to calculate a correction value of the luminance of the image signal generated based on the object image captured by the imaging unit,
wherein the smoothing unit reduces the dynamic range of luminance of the image signal using the correction value calculated by the correction value derivation unit.

4. The imaging apparatus according to claim 3, wherein the correction value derivation unit generates a plurality of the image signals having lowered resolutions which are mutually different, and calculates the correction value using the generated image signals.

5. The imaging apparatus according to claim 3, wherein the correction value derivation unit generates a simple luminance signal using a part of the image signal and calculates the correction value using the generated simple luminance signal.

6. The imaging apparatus according to claim 3, wherein the correction value derivation unit generates a simple luminance signal using a part of the image signal, generates a plurality of image signals in which the generated simple luminance signal has lowered resolutions that are mutually different, and calculates the correction value using the generated image signals.

7. The imaging apparatus according to claim 1, further comprising:
a display control unit configured to display an image generated according to the image signal having a dynamic range of luminance reduced by the smoothing unit and an image generated according to the image signal having color converted by the color conversion unit, on a display device; and
an operation unit that allows a user to specify a color of the image signals displayed on the display device,
wherein the color conversion unit converts a color of the image signal having a dynamic range of luminance reduced by the smoothing unit, according to an operation of the operation unit.

8. A method comprising:
reducing a dynamic range of luminance of an image signal generated based on an object image captured by an imaging unit;
performing a color conversion with respect to a color of the image signal whose dynamic range of luminance is reduced in accordance with the color specified by a user operation before the dynamic range of luminance is reduced;
specifying a color point to be converted from a plurality of color points in a predetermined color space by the user operation; and
converting the specified color point into another color point included in the plurality of color points in the predetermined color space.

9. The method according to claim 8, further comprising:
performing a gamma correction on the image signal whose dynamic range of luminance is reduced, and
converting the color of the image signal which is gamma-corrected in accordance with the color specified by the user operation.

10. The method according to claim 8, further comprising:
calculating a correction value of the luminance of the image signal generated based on the captured object image, and
reducing the dynamic range of luminance of the image signal using the calculated correction value.

11. The method according to claim 10, further comprising:
generating a plurality of the image signals having lowered resolutions which are mutually different, and
calculating the correction value using the generated image signals.

12. The method according to claim 10, further comprising:
generating a simple luminance signal using a part of the image signal, and
calculating the correction value using the generated simple luminance signal.

13. The method according to claim 10, further comprising:
generating a simple luminance signal using a part of the image signal,
generating a plurality of image signals in which the generated simple luminance signal has lowered resolutions that are mutually different, and
calculating the correction value using the generated image signals.

14. The method according to claim 8, further comprising:
displaying an image generated according to the image signal having a reduced dynamic range, and an image generated according to the image signal having a converted color, on a display device;
allowing a user to specify a color of the image signals displayed on the display device; and
converting a color of the image signal having a reduced dynamic range of luminance in accordance with the color specified by the user.

15. A non-transitory computer-readable storage medium that stores a program for instructing a computer to implement operations of:
reducing a dynamic range of luminance of an image signal generated based on a captured object image;
performing a color conversion on a color of the image signal having a reduced dynamic range of luminance in accordance with the color specified by a user operation before the dynamic range of luminance is reduced;
specifying a color point to be converted from a plurality of color points in a predetermined color space by the user operation; and
converting the specified color point into another color point included in the plurality of color points in the predetermined color space.

16. An imaging apparatus comprising:
an imaging unit configured to capture an object image;
a smoothing unit configured to reduce a dynamic range of luminance of an image signal generated based on the object image captured by the imaging unit; and
a color conversion unit configured to perform a color conversion of the image signal whose dynamic range of luminance is reduced by the smoothing unit in accordance with a color specified by a user operation before the dynamic range of luminance is reduced.

* * * * *